United States Patent [19]

Biancale

[11] Patent Number: 5,253,914
[45] Date of Patent: Oct. 19, 1993

[54] TARPAULIN COVER SYSTEM FOR TRUCKS

[76] Inventor: Vito Biancale, #461, Hwy. #5, R.R. #2, Dundas, Ontario, Canada, L9H 5E2

[21] Appl. No.: 952,262

[22] Filed: Sep. 28, 1992

[51] Int. Cl.⁵ ............................................. B60P 7/04
[52] U.S. Cl. ..................................... 296/100; 296/105; 160/84.1 E
[58] Field of Search ............... 296/98, 100, 104, 105, 296/219; 160/84.1 E, 264, 266, 268.1

[56] References Cited

U.S. PATENT DOCUMENTS

| | | | |
|---|---|---|---|
| 2,493,833 | 1/1950 | Reynolds | 296/104 X |
| 4,067,603 | 1/1978 | Fenton | 296/104 X |
| 4,189,178 | 2/1980 | Cramaro | 296/100 X |
| 4,518,193 | 5/1985 | Heider et al. | 296/98 |
| 4,944,551 | 7/1990 | Hardy, Jr. | 296/100 |
| 5,067,767 | 11/1991 | Biancale | 296/105 X |

FOREIGN PATENT DOCUMENTS 0040423  3/1979  Japan ............................ 296/98

*Primary Examiner*—Dennis H. Pedder

[57] ABSTRACT

An improved construction for intermediate bows used in movable tarpaulin systems for open-top truck bodies wherein the ends of the bows are provided with elongated sleeves of a uniform transverse cross-section comprising spaced parallel upper and lower sides joined by semi-circular ends to provide a somewhat elongated oval appearance in cross-section.

2 Claims, 1 Drawing Sheet

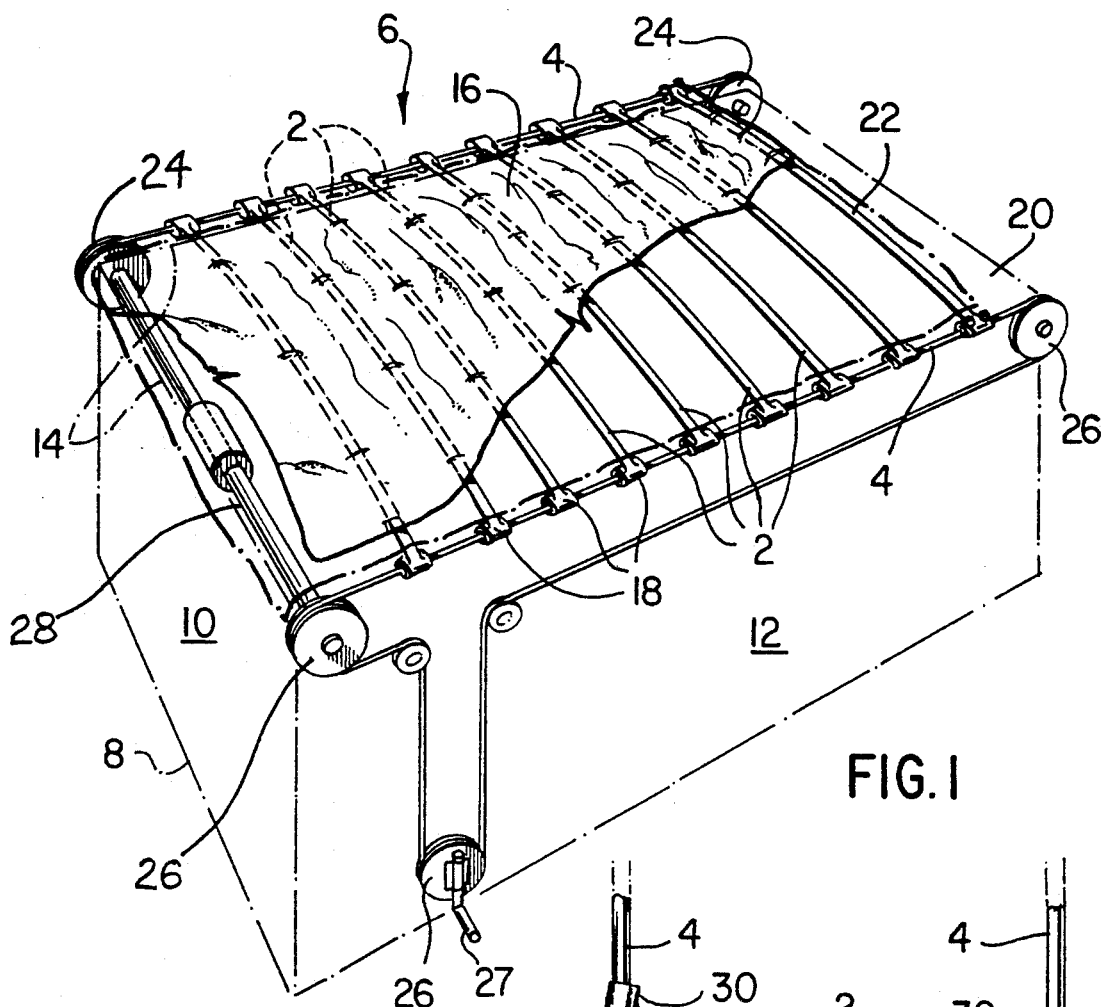
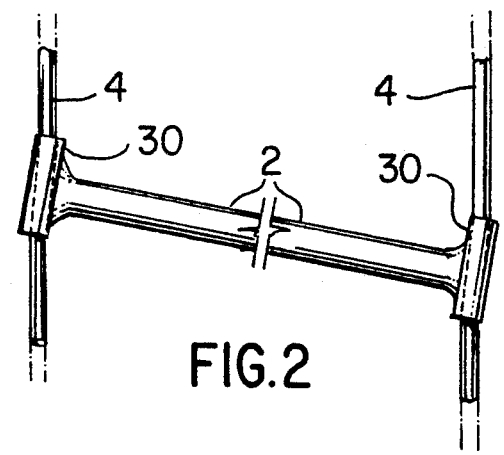
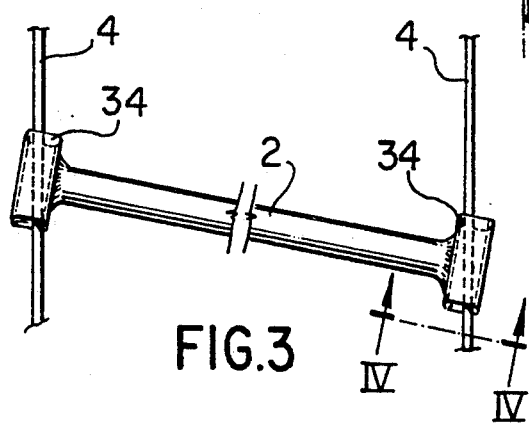
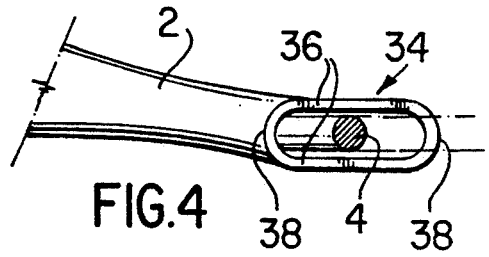

TARPAULIN COVER SYSTEM FOR TRUCKS

BACKGROUND OF THE INVENTION

This invention relates to an improved movable tarpaulin cover system for open-top truck bodies and more particularly relates to an improvement in the construction of intermediate bows used in such a system.

Movable tarpaulin cover systems for truck boxes or trailers of the type including a floor, front wall and a pair of upright side walls and/or flatbed trailers are known in the prior art. See for example Cramaro U.S. Pat. No. 4,189,178 issued Feb. 19, 1980. In such systems, one end of the tarpaulin to cover the truck body is anchored to the front wall. A plurality of intermediate support bows extend in parallel fashion from side to side transversely across a truck body, the bows being secured to the tarpaulin at spaced locations. The ends of the intermediate bows are slidably secured on each side of the truck body to movable cable means for longitudinal movement with respect to the truck body. A lead bow extends parallel to the intermediate bows from side to side transversely across a truck body and is secured to the tarpaulin. The ends of this bow are secured on each side to the movable cable means to move with them longitudinally with respect to the truck body. When the cables are moved in one direction, the lead bow and free end of the tarpaulin are drawn longitudinally to the back end of the truck body thereby pulling the tarpaulin. The intermediate bows are pulled rearwardly with the tarpaulin to varying distances, depending upon where they are secured to the tarpaulin rearwardly as required to cover the truck body. When the cable is moved in the opposite direction, the lead bow, intermediate bows and tarpaulin are retracted to the front end of the truck body to open position.

In the Cramaro system described and illustrated in the aforementioned U.S. patent, a pair of cables are provided, one on each side of the truck body or box, each cable providing one of a pair of horizontal reaches of cable extending along parallel to and above each of the upper edges of the box. The two cables are simultaneously winched for movement.

Despite the widespread use of this Cramaro tarpaulin system in North America today, a significant problem exists with it in that it tends to jam, during movement of the cables to either open or closed the tarpaulin over the truck body top. For proper operation, the cable must slide freely through the ends of the intermediate bows. In this regard to each end of the intermediate bows is secured a cylindrical sleeve through which the corresponding cable passes. What has tended to occur has been that one end or the other of an intermediate bow during movement of the tarpaulin to open or closed position, has moved either ahead of or behind the other end of the intermediate bow causing the cable to be crimped within the sleeve and preventing further relative movement of that cable through that sleeve. This causes the cable to drag this intermediate bow with it until further motion of that bow is prevented by the tarpaulin (when closing) or intermediate bows bunched at the front end of the truck body (when opening). At this point further motion of the cables in that direction is arrested and cannot be continued until the cable is uncrimped within the sleeve (usually by lateral realignment of that intermediate bow) and freed to slide again within that sleeve.

Because conventionally the bows arched upwardly across the truck box to support the tarpaulin in a raised position, it is not a solution merely to provide a sleeve of larger diameter. This would result in the arch of the bow falling forwardly or rearwardly since the enlarged sleeves would be supported too loosely on the cables.

It is an objection of the present invention to provide an improved tarpaulin cover system of the type in question which does not seize up so readily during operation.

SUMMARY OF THE INVENTION

The present invention is directed towards a movable tarpaulin cover system for the body of an open-top truck or trailer. One end of the tarpaulin is anchored to the front of the body. A plurality of intermediate bows extend in parallel fashion from side to side transversely across the body. The bows are secured at spaced locations to the tarpaulin for support. The bows are supported on a pair of cables, one on each side of the body. Each cable provides a horizontal reach of the cable extending along parallel to and above the upper edge of a different one of the sides of the body. Sleeves are provided at the ends of the intermediate bows through which said reaches of the cables pass. The cables slide through the sleeves during longitudinal movement with respect to the body. A lead bow extends parallel to the intermediate bows from side to side transversely across the body. A lead bow is secured to the free end of the tarpaulin, The ends of this bow are secured to the cable reaches for movement longitudinally with respect to the body. Movement of the cable reaches and lead bow in one direction draws the free end of the tarpaulin longitudinally to the back end of the body to covering position and draws the intermediate bows and tarpaulin associated with each proportionately rearwardly as dictated by the location at which each intermediate bow is secured to the tarpaulin. Movement of the lead bow in the other direction retracts the free end of the tarpaulin and the lead and intermediate bows to the front end of the body to open position.

The present invention particularly relates to an improved construction of intermediate bows for such a system wherein the sleeves of the intermediate bows are elongated and of a transverse vertical cross-section comprising spaced parallel upper and lower sides in operation oriented transversely from side to side with respect to the trailer body joined by semi-circular ends so as to provide a somewhat elongated oval appearance in cross-section. It is preferred that the distance between the upper and lower sides be slightly greater than the diameter of the cable.

Intermediate bows of the construction in accordance with the present invention significantly facilitate the sliding passage of the cables on either side through the sleeves ensuring that even when one end of the bow is ahead of or behind the other, the cables will not seize up or become crimped within the sleeves ensuring proper operation of the system.

BRIEF DESCRIPTION OF THE DRAWINGS

These and other objects and advantages of the invention will become apparent upon reading the following detailed description and upon referring to the drawings in which:

FIG. 1 is a schematic perspective view of the tarpaulin system of the type in question in which intermediate bows in accordance with the present invention have been mounted.

FIG. 2 is a plan view of a conventional bow, prior to the present invention, mounted on cables of a tarpaulin system of the type in question.

FIG. 3 is a plan view of a intermediate bow in accordance with the present invention mounted on such cables.

FIG. 4 is a section view along line IV—IV of FIG. 3 illustrating the transverse cross-sectional profile of the end sleeves of the intermediate bows of FIG. 1 and 3.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Turning to FIG. 1, there is illustrated a series of intermediate bows 2 in accordance with the invention mounted on and supported by a pair of cables 4 of a tarpaulin system 6 of the type described and illustrated generally in Cramaro U.S. Pat. No. 4,189,178. A tarpaulin system 6 is intended to cover an open-top truck or trailer body 8 (phantom) having a front wall 10 and side walls 12 each with an upper edge 14. Intermediate bows 2 extend in parallel fashion from side to side transversely across the open top of body 8, the bows being secured at spaced locations to a tarpaulin 16 for support thereof. Sleeves 18, at the ends of intermediate bows 2 are slidably secured, for relative longitudinal movement with respect to body 8, to upper reaches 20 of cable 4, upper reaches 20 extending horizontally in parallel fashion above and proximal to upper edges 14 of sides 12 as illustrated. A lead bow 22 extends parallel to intermediate bows 2, from side to side transversely across body 8 towards the back thereof. Lead bow 22 is secured at its ends to cables 4 as illustrated, to move along upper reaches 20 (extending between pulleys 24 and 26) with movement of the cables. Lead bow 22 is secured to the free end of tarpaulin 16. Movement of the lead bow 22 in one direction, by turning of crank 27 (or any other appropriate mechanism) draws the free end of tarpaulin 16 longitudinally to the back end of body 8 and at the same time draws the intermediate bows 2 and tarpaulin 16 associated with each proportionately rearwardly as dictated by the location at which each intermediate bow is secured to the tarpaulin, to a covering position. Movement of the lead bow 22 in the other direction retracts the free end of the tarpaulin as the lead bow 22 pushes intermediate bows 2 to the front end 10 of the body so that the tarpaulin is in open position. Motion given to the corresponding cable 4 by turning of crank 27 is transmitted to the other cable 4 by means of axle 28 extending between opposite pulleys 26 on either side of body 8 as illustrated.

With conventional intermediate bows of the type for example described and illustrated in Cramaro U.S. Pat. No. 4,189,178, the ends of the intermediate bows, as illustrated in FIG. 2, were provided with circular sleeves 30 which fairly snugly but slidably enveloped the upper reaches 20 of opposite cables 4. If, as often happened, one end of an intermediate bow 2 got too far out of lateral alignment with the other end, cable 4 was not free to slide through sleeve 30 at one or both of the ends of the intermediate bow, preventing proper operation of the tarpaulin system. More particularly, if the cable became seized or frozen within the end sleeve 30 of one or more of the intermediate bows, for example during retraction of the cover, that bow would commence to travel towards the front of the truck body 8 at the same speed of cable 4, causing any intermediate bows between it and front wall 10 to be moved towards wall 10 until that seized intermediate bow could travel no more in that direction as the intermediate bow approached pulleys 26 and front wall 10. At this point the cable 4 in question could no longer be moved in this same, retracting direction until cable 4 was freed to again slide without obstruction within that end sleeve 30. This situation, with conventional tarpaulin systems, might arise several times in the course of a single retraction of the tarpaulin, requiring an operator to climb up to the top of the truck, locate the seized intermediate bow and free the cable to slide within its end sleeve.

Conversely, when the tarpaulin on such a system having conventional intermediate bows was being moved from retracted to covering position at the end of body 8, that the seizing of cable 4 in an end sleeve 30, before the tarpaulin was fully opened, would prevent the tarpaulin from being moved completely to the end of the truck body 8 to fully cover it until such time as cable 4 was freed to slide again freely in end sleeve 30 of that intermediate bow.

In accordance with the present invention, as illustrated in FIGS. 1, 3 and 4, it has been determined that intermediate bows 2, if provided with end sleeves 34, of the illustrated construction, will avoid this problem of cable seizure within sleeve 34. More particularly, end sleeves 34 are of elongated construction and have a uniform cross-section (FIG. 4) which comprises opposite, parallel sides 36 spaced apart a distance slightly greater than the diameter of cable 4, sides 36 being joined by semi-circular ends 38 to form an elongated oval cross-sectional configuration as illustrated. Thus, if one side of an intermediate bow 2 becomes out of lateral alignment with its other side, as illustrated in FIG. 3, cable 4 is still free to slide through sleeve 34 without obstruction or seizure. At the same time, this construction ensures maintenance of the bows in their vertical orientation without flopping forwardly o rearwardly as would be the case, for example, if the end sleeves of the intermediate bows were simply provided with a greater diameter.

The illustrated construction, in accordance with the present invention, has significantly reduced the need for grease on cable 4, compared to that which was required with the conventional construction of FIG. 2. At the same time, a virtually seizure-free operation of the intermediate bows with respect to cable 4 is provided during opening and closing of the tarpaulin on the top of truck body 8.

Thus it is apparent that there has been provided in accordance with the invention Tarpaulin Cover System for Trucks that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. In a movable tarpaulin cover system for the elongated body of an open-top truck or trailer having sides front and back, the system comprising:

a tarpaulin to cover the body, one end of which tarpaulin is anchored to the front of the body, a plurality of upwardly curved intermediate bows extending in parallel fashion from side to side transversely across the body, the bows secured at spaced locations to the tarpaulin for support thereof, the bows supported on a pair of cables, one on each side of the body, each cable providing horizontal reach of the cable extending along parallel to and above the upper edge of a different one of the sides of the body, sleeves being provided at ends of the intermediate bows through which said reaches of the cables pass, the cables sliding through the sleeves during longitudinal movement with respect to the body, and a lead bow extending parallel to the intermediate bows from side to side transversely across the body, the lead bow being secured to the free end of the tarpaulin and ends of this bow being secured to said cable reaches for movement therewith longitudinally with respect to the body, movement of the lead bow in one direction to draw the free end of the tarpaulin longitudinally to the back end of the body to covering position and to draw the intermediate bows and tarpaulin associated with each proportionately rearwardly depending upon the location at which each intermediate bow is secured to the tarpaulin, movement of the lead bow in the other direction to retract the free end of the tarpaulin and the lead and intermediate bows to the front end of the body to open position, the improvement characterized by the sleeves of the intermediate bows being elongated in the direction of movement of the corresponding cable reach to a length sufficient to maintain their associated bows, during movement, arched upwardly across the body and being of a uniform transverse vertical cross-section comprising spaced parallel upper and lower sides in operation oriented transversely from side to side with respect to the trailer body and joined by semi-circular ends to provide an obround appearance in cross-section.

2. The improvement of claim 1 wherein the distance between the upper and lower sides is slightly greater than the diameter of the cable.

* * * * *